June 5, 1923.
B. R. BLACKWELDER
TIRE FABRIC
Filed Oct. 14, 1921
1,457,892
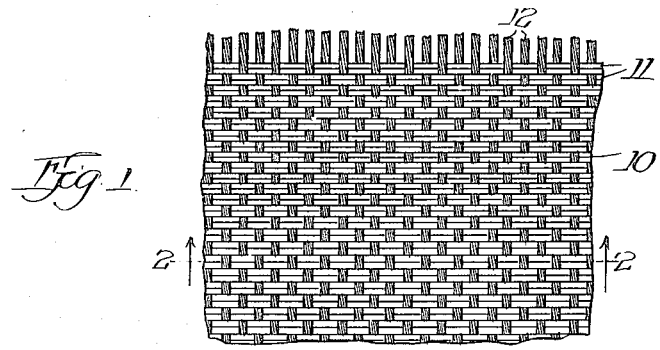
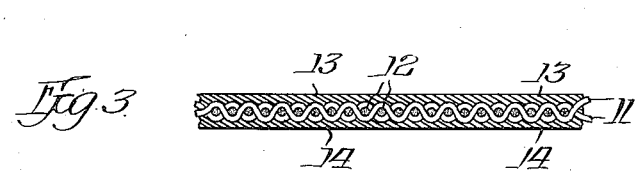
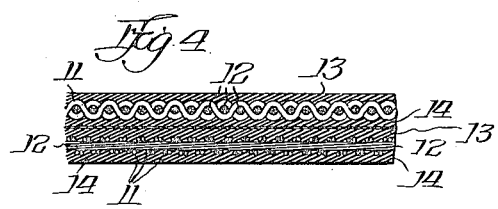
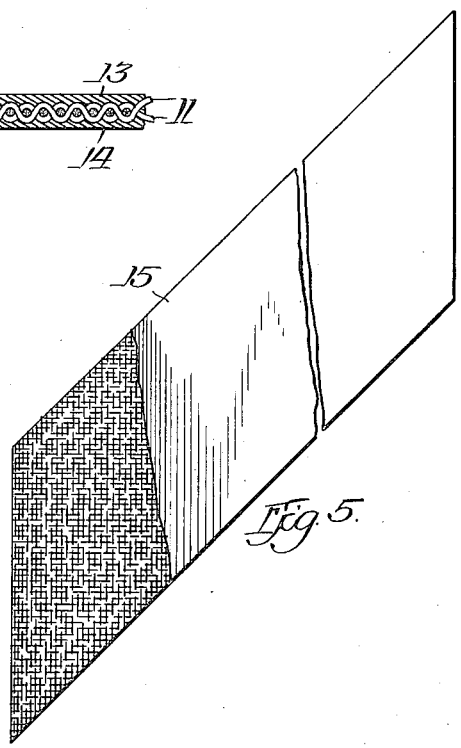
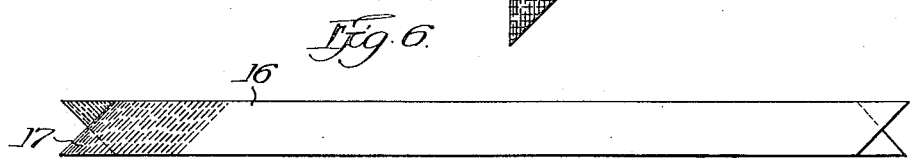

Patented June 5, 1923.

1,457,892

UNITED STATES PATENT OFFICE.

BERT R. BLACKWELDER, OF LAPORTE, INDIANA.

TIRE FABRIC.

Application filed October 14, 1921. Serial No. 507,716.

*To all whom it may concern:*

Be it known that I, BERT R. BLACKWELDER, a citizen of the United States, residing at Laporte, in the county of Laporte and State of Indiana, have invented certain new and useful Improvements in Tire Fabrics, of which the following is a specification.

This invention is a reenforced tire fabric, and an object of the invention is to provide a new and improved tire fabric capable of being employed in building up tire carcasses in any common or preferred manner upon any tire building machine.

A further object of the invention is to obtain puncture proof properties in a tire carcass built of the present fabric.

Another object of the invention is to provide for ventilating a tire carcass built of the present fabric, and in this connection to provide for leading the heat from the tread of the carcass to the side walls thereof where it may become dissipated into the atmosphere.

In carrying out my invention I incorporate metallic strands in the reenforcement in a new and novel manner calculated to to bring about both puncture proof and ventilating properties in a tire carcass built of the present tire fabric.

These and other objects of my invention will be more fully and better understood by reference to the accompanying sheet of drawings, in which—

Figure 1 is an elevational view of my improved tire fabric before the rubber sheet is applied thereto.

Figure 2 is a sectional elevation on line A—A of Figure 1.

Figure 3 is a sectional view similar to Figure 2, after the material has been coated with rubber.

Figure 4 is a sectional view showing two plies of the material superimposed upon each other.

Figure 5 is an elevational view of a tire strip with part of the surfacing broken away showing the direction in which the cords extend.

Figure 6 is a view showing two strips, such as illustrated in Figure 5, superimposed upon each other.

Referring now specifically to the drawings and in which like reference characters refer to like parts, a section of tire fabric 10 is shown having longitudinally extending warp strands 11 therein composed of cotton, or any other suitable fabric material, and through which transversely extending metallic woof strands 12 extend, these strands being composed of any metallic substance, such as wire or the like, particularly a wire such as woven picture wire I find to be very desirable for this purpose. It will be noted that the warp strands 11 are placed in pairs so that a material is provided which is loosely woven and which has small openings or interstices between the warp strands 11 and the woof strands 12 into which the rubber material is pressed. The material shown in Figure 1 is woven upon an ordinary loom in the usual manner. After a strip of material, such as shown in Figure 1, has been woven, it is passed between the usual calender rolls and a strip of material 13 of the rubber compound imposed upon the fabric, this material being pressed through the openings between the warp and the woof strands, and extending through the fabric and becoming clinched, as it were, on the opposite side, so that the woof strands 12 are thoroughly incorporated or embedded in the rubber compound which forms a protecting coating thereabout so that the wire strands do not cut through the warp strands 11, nor do they produce chafing. Thereafter the material is run through other calendering rolls and a strip of skim rubber or rubber compound 14 is placed upon the side of the fabric through which the rubber has been pressed, so that the fabric shown in Figure 10 is thoroughly embedded and protected by rubber or rubber compound strips 13 and 14 placed upon each side thereof. The fabric layers should be thoroughly covered with rubber compound to reduce friction to a minimum. This material is then cut into strips, such as 15, shown in Figure 5, and these strips are in condition to be used upon the usual tire building stands on which tire carcasses are made, a pair of these strips 16 and 17 being shown in Figure 6 superimposed upon each other and which go to make up the tire carcasses. It will be noticed that the woof strands extend across each other at right angles, thus preventing a completely armored surface and which is adapted to resist any article such as a tack or the like over which the tire may pass.

In Figure 4 is shown the manner in which these cords extend when the strips such as 16 and 17 are placed upon each other and the strips 13 and 14 becoming thoroughly pressed into and attached to the fabric 10 so that there is no danger of the layers 16 and 17 stripping apart in service, nor is there any danger of the woof strands 12 becoming separated and parting from each other in service and thus weakening the tire fabric, with the result that a blow-out or rupture of the walls of the tire carcass is likely to occur.

It will thus be seen that I am able to employ metallic strands in a tire which extend circumferentially around the entire body of the tire carcass and are bound under the beads in the tire carcass in exactly the same manner as fabric tires are at present manufactured. Furthermore, the method of construction makes it possible to stretch the fabric around the bead in building. These transversely extending metallic strands carry the heat from the tread surface around to the sides of the tire where the walls are thinner and where it is carried away by the action of the air coming in contact with the side walls of the carcass. It will be understood, of course, that the usual breaker strips and tread surface are placed upon the tire carcass after it has been built up, such as is common in tire structures at the present time, and that thereafter the whole is vulcanized so that the complete tire casing is formed, and that my invention has to do only with the protection of what is termed a tire carcass.

It will be understood from the foregoing description that the metallic cords are thoroughly incorporated with the rubber so that a coating of rubber is formed thereabout and which prevents the metallic woof strands from cutting through or chafing the fabric warp strands or cords, which has heretofore made the use of metallic strands impractical in an automobile tire; and also that the weaving of the fabric in the manner in which I provide, namely, a tire of longitudinally extending warp strands 11, insures a fabric which is loosely woven and having interstices between the strands so that the fabric is easily impregnated with the rubber.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

I claim:

1. A tire fabric comprising a rubber sheet having embedded therein a reenforcing woven fabric, the warp of the reenforcing fabric including fabric strands only and the woof including wire strands only, the interstices of the reenforcing fabric being filled by and the wire strands being coated with portions of the rubber sheet material.

2. A tire fabric comprising a rubber sheet having embedded therein a reenforcing woven fabric, the warp of the reenforcing fabric including fabric strands only disposed in pairs, and the woof including single wire strands only, the interstices of the reenforcing fabric being filled by and the wire strands being coated with portions of the rubber sheet material.

Signed at Chicago, Illinois, this 6th day of October, 1921.

BERT R. BLACKWELDER.